United States Patent [19]

Buisson et al.

[11] Patent Number: 4,954,767

[45] Date of Patent: Sep. 4, 1990

[54] CONTROL DEVICE FOR SWITCHED POWER SUPPLY

[75] Inventors: Jean-Michel Buisson, Colombes; Jean-Marie Soubrier, Gentilly, both of France

[73] Assignee: Thomson-CSF, Puteaux, France

[21] Appl. No.: 461,690

[22] Filed: Jan. 8, 1990

[30] Foreign Application Priority Data

Jan. 20, 1989 [FR] France ................. 89 00687

[51] Int. Cl.$^5$ ............................................. G05F 1/575
[52] U.S. Cl. ..................................... 323/283; 323/282; 323/351
[58] Field of Search ..................... 323/282, 283, 351

[56] References Cited

U.S. PATENT DOCUMENTS 4,128,771 12/1978 Domenico ........................... 323/283
4,425,612 1/1984 Bahler et al. ...................... 323/283
4,538,231 8/1985 Abe et al. ........................... 323/283

FOREIGN PATENT DOCUMENTS 3334461 4/1985 Fed. Rep. of Germany .
2438289 4/1980 France .

Primary Examiner—Steven L. Stephan
Assistant Examiner—Jeffrey Sterrett
Attorney, Agent, or Firm—Oblon, Spivak, McClelland, Maier & Neustadt

[57] ABSTRACT

The device is designed to give a signal for the control of the ballast signal of a switched supply by using an index value signal. To benefit from the advantages of a digital control, the control signal is prepared as a function of logic values, pre-programmed in an encoding memory. The value of the index value signal at a given instant defines a starting and an ending of a zone in the encoding memory, and the cyclical reading of this zone through reading means gives the control signal.

4 Claims, 1 Drawing Sheet

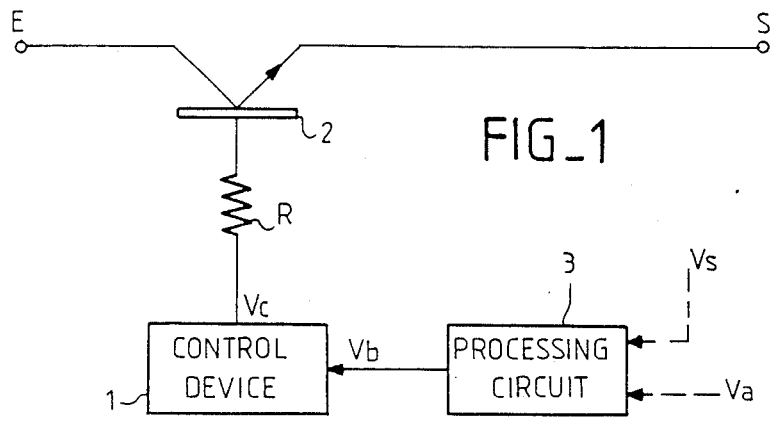
FIG_1
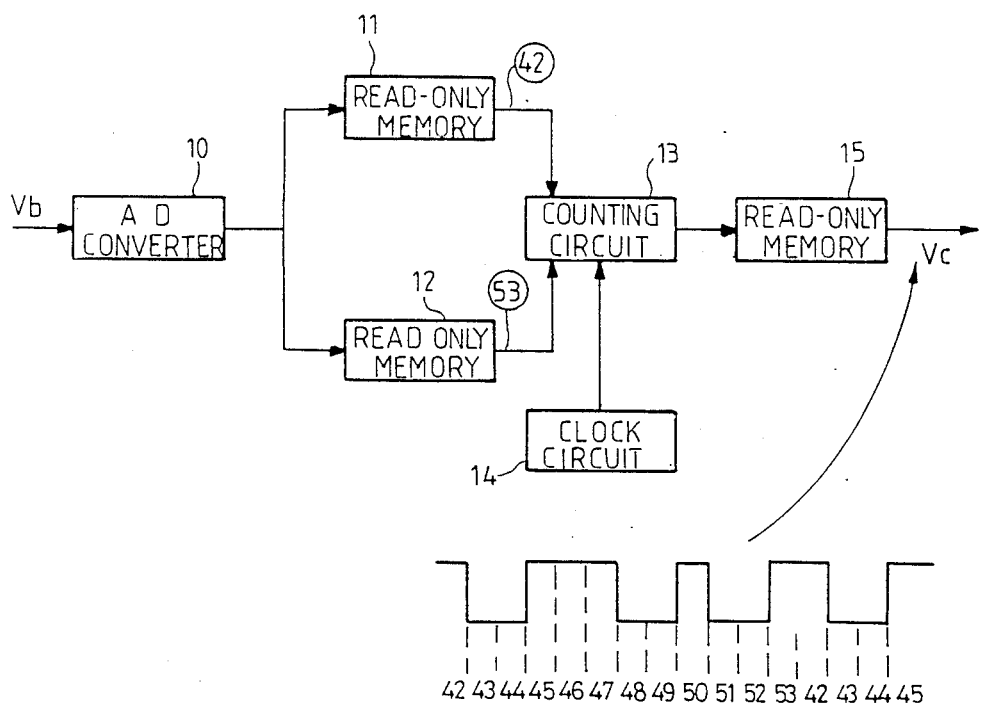
FIG_2

1

CONTROL DEVICE FOR SWITCHED POWER SUPPLY

BACKGROUND OF THE INVENTION

1. Field of the Invention

The present invention concerns a control device for a switched power supply, namely a device designed to control a switching circuit in order to permit or prohibit the supply of a voltage, during very short periods, and in order to obtain, at the output of the switching circuit, a voltage with a mean value that is a function of a signal with an index value. This signal with an index value may be, for example, the output voltage of the supply or a signal representing a value to be obtained for this output voltage, or an adjusting signal which is a function, for example, of the temperature. The signal with an index value may also be a combination of signals such as this.

2. Description of the Prior Art

Power supplies comprising devices such as these are known: they make it possible to obtain adjustable or fixed DC voltages from other DC voltages or from rectified AC voltages They can also be used to obtain AC voltages from DC voltages.

Known control devices have an oscillator circuit and, generally, depending on whether the signal with an index value is greater or smaller than a reference value, the output signal of the oscillator circuit is applied or not applied to the switching circuit to turn it on or off.

These known devices have problems related to development and final fabrication: thus, non-linearity and lack of precision may give rise, inter alia, to insufficient stability, especially in the oscillator, and may create difficulties in making the output supply signal proportionate to a manual control acting on the set signal.

SUMMARY OF THE INVENTION

An object of the present invention is to prevent or, at least, to reduce these drawbacks.

This is achieved, in particular, by making the control device in digital form.

According to the present invention, there is provided a device for the control of a switched supply, this supply receiving a voltage to be cut off and comprising a processing circuit to give a signal with an index value to the control device, and a switching circuit to cut off the voltage under the control of a switching signal, the control device comprising a first memory circuit containing pre-programmed zones to give, as a signal, the switching signal, a second memory circuit to make a pre-determined zone, among the pre-programmed zones, correspond to each value of the signal with an index value and reading means for the cyclical reading of the pre-determined zone.

BRIEF DESCRIPTION OF THE DRAWING

The present invention will be understood more clearly and other features will appear from the following description and from the appended figures, of which:

FIG. 1 shows the general simplified diagram of a switched supply applicable to both a prior art supply and a supply according to the invention;

FIG. 2 shows the diagram of a control device, according to the invention, for a switched supply.

In the different figures, the corresponding signals are designated by the same references.

MORE DETAILED DESCRIPTION

FIG. 1 gives a schematic view of how a switched supply is achieved. This supply has an input E to which a voltage is applied. The input E is connected to an output S through a switching circuit 2, formed chiefly by a power transistor 2 which, under the conditions in which it is presently used, is commonly called a ballast transistor. The collector of the transistor 2 is connected to the input E, its emitter is connected to the output S and its base is connected, by a resistor R, to the output of a control device 1. The input of the control device 1 is connected to the output of a processing circuit 3.

From signals such as the output voltage Vs of the supply and/or one or more signals which can come from adjusting potentiometers or sensors, the processing circuit 3 prepares a signal Vb with an index value, depending on which the control device 1 delivers a switching signal, Vc, which controls the on or off state of the transistor 2. In a supply according to the prior art, the control device 1 includes an oscillator, the processing circuit 3 controls the on or off state of the output of this oscillator and the output of this oscillator controls the ballast transistor. The output of the oscillator, namely the output of the control device, should be properly adjusted to control the output of the oscillator at the right moment.

FIG. 2 shows how the control device 1 of FIG. 1 can be made, according to the invention.

The index value signal Vb which, in the example described, is an analog signal, is transposed into digital form by an analog-digital converter 10. The signal obtained is used as a reading signal for two pre-programmed programmable read-only memory (PROMS), 11 and 12, which respectively give two signals, one representing a start and the other representing an end of a reading zone in an encoding memory, formed by a third programmable read-only memory 15.

In the example shown through FIG. 2, it was assumed that, at a given instant, the addresses 42 and 53 of the read-only memory 15 corresponded, in the memories 11 and 12 respectively, to the index value signal Vb i.e. it was assumed that the signals contained in the zone of the memory 15 going from the address 42 to the address 53 corresponded to the index value signal Vb considered.

This signals of the start and the end of a zone are applied to a counting circuit 13 which gives, at its output, a digital signal that varies, in the case considered, from the value 42 to the value 53, at the rate of a clock circuit 14. This digital signal is the sum of the zone starting signal (42 in the case considered) and of the signal of a ring counter, counting cyclically, at the rate of the clock circuit 14, from the value 0 to the value N, where N is the difference between the digital values of the zone starting and ending signals (N=53 - 42=11 in the case considered).

The output signal of the counting signal is used as a signal for reading the read-only memory 15. This memory delivers the switching signal Vc and this signal is formed by successive sequences of signals. Each sequence corresponds to the signals of the zone designated by the index value signal Vb at the instant considered and the end of a sequence coincides with the start of the following sequence. FIG. 2 gives a graphic representation of the switching signal Vc, and gives, for each part of the signal, the address, in the memory 15, where it has been read. It is this signal Vc that, when it is at its top level, controls the opening of ballast transistor 2 according to FIG. 1 and makes this transistor go into the off position when it is at its bottom level.

As for the programming of the memory 15, it has to be noted that it was made in the course of a preliminary preparation process using:

- systems of known curves making a given shape of a switching signal Vc correspond to a relationship between the signals obtained at the input E and the output S;
- the characteristics of the compensations imposed by the sensors which give the index value signal Vb: should, for example, the signal Vb be not linear;
- successive approximations during the finalizing process.

In the embodiment that served a an example for the present description, the clock circuit delivered a 50 kHz signal and there were 1000 addresses in each of the memories 11 and 12 corresponding to the different values of the index value signal. These values are in no way restrictive, and the choice of the frequency of the clock circuit and of the width of the memory zones need to be determined solely by the characteristics of the input and output signals of the supply. It is even possible to consider a case where, in a control device, the width of the zone designated in the memory 15 can vary according to the value of the index value signal.

Furthermore it is possible, for example, to eliminate the zone starting read-only memory 11 or zone ending read-only memory 12, in seeing to it that the most significant bits and/or least significant bits o the index value signal, in its digital form, designate the start and/or end of the zone. This requires a prior processing of the index value signal, which actually consists in placing the memories 11 and/or 12 outside the control device, i.e. in the processing circuit. And, of course, when the index value signal Vb is delivered in digital form, the analog-digital converter 10 of FIG. 2 no longer has any reason to exist.

The control device that has been described has been made for a light box luminance control system or, more precisely, for the control of fluorescent tubes providing the background lighting of liquid crystal display (LCD) screens. More generally, the control device according to the invention can be applied to any switched supply.

What is claimed is:

1. A device for the control of a switched supply, this supply receiving a voltage to be cut off and comprising a processing circuit to give a signal with an index value to the control device, and a switching circuit to cut off the voltage under the control of a switching signal, the control device comprising a first memory circuit containing pre-programmed zones to give, as a signal, the switching signal, a second memory circuit to make a pre-determined zone, among the pre-programmed zones, correspond to each value of the signal with an index value and reading means for the cyclical reading of the pre-determined zone.

2. A device according to claim 1, wherein the first memory circuit comprises addresses, each pre-programmed zone having a starting address and an ending address in the first memory circuit, and wherein the second memory circuit has a read-only memory to make one of the two starting and ending addresses of the pre-determined zone correspond to the index value signal.

3. A device according to claim 2, wherein the second memory circuit has another read-only memory to make the other one of the two starting and ending addresses of the pre-determined zone correspond to the index value signal.

4. A device according to claim 3, wherein the index value signal is encoded by means of bits in digital form and wherein the encoding is done so that the most significant bits and the least significant bits correspond to the starting and ending addresses of the pre-determined zone.

* * * * *